United States Patent
Brize et al.

(10) Patent No.: US 7,294,598 B2
(45) Date of Patent: Nov. 13, 2007

(54) DIELECTRIC OXIDE MATERIALS

(75) Inventors: Virginie Brize, Tours (FR); Monique Gervais, Larcay (FR)

(73) Assignee: STMicroelectronics SA (FR)

( * ) Notice: Subject to any disclaimer, the term of this patent is extended or adjusted under 35 U.S.C. 154(b) by 0 days.

(21) Appl. No.: 11/322,516

(22) Filed: Dec. 30, 2005

(65) Prior Publication Data

US 2006/0148636 A1    Jul. 6, 2006

(30) Foreign Application Priority Data

Dec. 30, 2004   (FR) ................... 04/53245

(51) Int. Cl.
*C04B 35/01*     (2006.01)
*C04B 35/462*    (2006.01)
*C04B 35/624*    (2006.01)
*C04B 35/64*     (2006.01)

(52) U.S. Cl. ............ 501/136; 264/614; 264/615; 264/620; 264/621; 264/624

(58) Field of Classification Search .......... 501/1, 501/136; 264/614, 615, 620, 621, 624
See application file for complete search history.

(56) References Cited

U.S. PATENT DOCUMENTS

| | | | | |
|---|---|---|---|---|
| 3,682,766 A | * | 8/1972 | Maher | ........ 428/434 |
| 3,825,653 A | * | 7/1974 | Duerksen et al. | ........ 423/598 |
| 4,612,600 A | | 9/1986 | Hodgkins | |
| 4,761,711 A | * | 8/1988 | Hiremath et al. | ........ 361/321.5 |
| 4,820,668 A | * | 4/1989 | Kato et al. | ........ 501/134 |
| 5,672,378 A | * | 9/1997 | Maher et al. | ........ 264/615 |
| 6,107,227 A | * | 8/2000 | Jacquin et al. | ........ 501/138 |

FOREIGN PATENT DOCUMENTS

GB    574577 A    1/1946

OTHER PUBLICATIONS

P. Jha, et al.; "Polymeric citrate precursor route to the synthesis of the high dielectric constant oxide, CaCu3T14012"; Materials Letters, North Holland Publishing Company, Amsterdam, NL, vol. 57, No. 16-17, May 2003, pp. 2443-2446.

A. Hassini, et al.; "Synthesis of Ca0 25Cu0.756i03 and infrared characterization of role played by copper", Materials Science and Engineering B, Elsevier Sequoia, Lausanne, CH, vol. 87, No. 2, Nov. 15, 2001, pp. 164-168.

French Search Report for FR 0453245 dated Sep. 1, 2005.

Ramirez A P et al., "Giant Dialectric Constant Response in a Copper-Titanate" Solid State Communications, Oxford, GV, vol. 115, No. 5(Jun. 19, 2000)pp. 217-220, XP001058189.

European Search Report for EP 05 11 3017 dated Feb. 1, 2006.

* cited by examiner

*Primary Examiner*—David M Brunsman
(74) *Attorney, Agent, or Firm*—Lisa K. Jorgenson; Bryan Santarelli; Graybeal Jackson Haley LLP

(57) ABSTRACT

A material made of a dielectric oxide of type $Ca_{0.25}Cu_{0.75}TiO_3$ having a dielectric constant greater than 3,000.

25 Claims, No Drawings

US 7,294,598 B2

DIELECTRIC OXIDE MATERIALS

PRIORITY CLAIM

This application claims priority from French patent application No. 04/53245, filed Dec. 30, 2004, which is incorporated herein by reference.

BACKGROUND

1. Technical Field

The present invention relates to oxide powders of materials with a high electric permittivity and a manufacturing method thereof.

2. Discussion of the Related Art

Dielectric oxides are likely to have many applications due to their high theoretical electric permittivity, for example, from 9,000 to 12,000 for ceramics of type $Ca_{0.25}Cu_{0.75}TiO_3$. In microelectronics, such dielectric ceramics are likely to be used as insulators in the manufacturing of integrated circuits. To deposit such a ceramic in the form of a thin layer with a thickness on the order of from 100 to 500 nm, it has been provided to use methods of bombarding a target formed by the ceramic.

The wet synthesis of ceramics is more specifically described in the case of ceramics of the $Ca_{0.25}Cu_{0.75}TiO_3$ family in articles "Polymeric citrate precursor route to the synthesis of the high dielectric constant oxide, $CaCu_3Ti_4O_{12}$" by P. Jha et al. published in Material Letters 57 (2003) 2443-2446 and "Synthesis of $Ca_{0.25}Cu_{0.75}TiO_3$ and infrared characterization of role played by copper", by A. Hassini, M. Gervais et al., published in Materials Science and Engineering B87 (2001) 164-168. This synthesis is performed according to the following method.

The different components, copper, calcium, and titanium, are brought together according to stoichiometric proportions $Ca_{0.25}Cu_{0.75}Ti$ in the form of liquid precursors such as copper nitrate, calcium nitrate, and titanium citrate. The previous precursors are mixed with one or several monomers capable of causing a bi-directional polymerization, such as an acrylamide mixture (added by a proportion of 6% of the total volume) and of N,N'-methylbisacrylamide (added by a proportion of from 3 to 3.5% of the total volume). The polymerization is then performed. During the polymerization, the mixture is heated to a temperature on the order of 100° C. and is generally stirred. Due to the presence of copper, a catalyst such as azoisobutyronitrile is generally introduced to trigger a polymerization. Once the polymerization is over, after from 5 to 30 minutes according to the volume of the solution, an organic gel, sometimes called an "auxiliary" gel, is obtained, in which the cations are trapped, set. A crystallization by a calcinations under ventilation is then performed at a temperature on the order of from 650 to 750° C. for approximately twenty hours. A powder formed of the lamellar aggregation of crystal microstructures in wafers is then obtained. This powder is then shaped as a bar or a pellet, preferably, in the presence of a binder such as polyvinylic alcohol (PVA) or polyethyleneglycol (PEG). For this purpose, it is started by breaking the wafers by a stirring in the presence of zirconia and isopropanol balls, by the removal of the balls, and a drying capable of evaporating the isopropanol. A small amount of binder is added to the crystal powder thus obtained and the mixture is completely dried in a furnace at 200° C. for at least four hours. The resulting dry product is shaped up by isostatic pressing and sintering at 1,000° C. for some twenty hours.

The obtained target is used as a source of the species of a thin layer deposition by bombarding. The dielectric constant of the $CaCu_3Ti_4O_{12}$ target is measured and ranges between 700 and 3,000, as discussed in previously-mentioned article "Polymeric citrate precursor route to the synthesis of the high dielectric constant oxide, $CaCu_3Ti_4O_{12}$" by P. Jha et al.

The obtained limiting value of 3,000 is much smaller than the theoretical value of the dielectric constant of a material of type $Ca_{0.25}Cu_{0.75}TiO_3$ ranging between 9,000 and 12,000.

The dielectric characteristics depend in particular on the density and on the size of the target ceramic grains.

SUMMARY

An embodiment of the present invention provides an oxide material of type $Ca_{0.25}Cu_{0.75}TiO_3$ with a dielectric constant greater than 3,000.

Another embodiment of the present invention provides such a material with a dielectric constant close to 10,000.

Another embodiment of the present invention provides such a target having a grain size greater than that of conventional targets obtained by wet synthesis.

Another embodiment of the present invention provides a method for manufacturing such a target.

Another embodiment of the present invention provides a method for shaping a dielectric oxide powder.

To achieve these embodiments, a material made of a dielectric oxide of type $Ca_{0.25}Cu_{0.75}TiO_3$ is provided having a dielectric constant greater than 3,000.

According to another embodiment of the present invention, the grain size of the material is at least equal to 2 μm.

An embodiment of the present invention is a method for shaping a dielectric oxide, comprising the steps of:

calcinating an ordinary gel comprising the oxide components and a polymer at a minimum temperature capable of obtaining a crystal system;

reducing to powder the calcinations product;

adding a liquid binder to the powder; and drying the mixture of the binder and of the powder and crushing the mixture in the drying.

According to an embodiment of the present invention, the method further comprises, after the drying step, an isostatic pressing and a sintering of the dried product.

According to an embodiment of the present invention, the drying step comprises the steps of:

partially drying the mixture at a relatively small temperature; and completely drying the mixture at a relatively high temperature.

According to an embodiment of the present invention, the oxide powder is of $Ca_{0.25}Cu_{0.75}TiO_3$ type, the calcinations step being performed at 500° C. for twenty hours, the binder being polyvinylic alcohol, the partial drying being performed in a drying chamber at 60° C. and the full drying being performed in a furnace at 200° C. for at least four hours.

According to an embodiment of the present invention, the crushing is continuously performed during the drying.

According to an embodiment of the present invention, the crushing is performed at regular intervals during the drying.

The foregoing and other features and advantages of the present invention will be discussed in detail in the following non-limiting description of specific embodiments.

DETAILED DESCRIPTION

According to an embodiment of the present invention, a ceramic, of the $Ca_{0.25}Cu_{0.75}TiO_3$ family is manufactured in the form of a target intended to be bombarded to deposit $Ca_{0.25}Cu_{0.75}TiO_3$ in a thin layer as follows.

Stoichiometric quantities ($Ca_{0.25}Cu_{0.75}TiO_3$) of copper in the form of copper nitrate, of calcium in the form of calcium nitrate, and of titanium in the form of titanium citrate are mixed with acrylamide and N,N'-methylbisacrylamide. The obtained solution has a dark blue color. The source copper, calcium, and titanium precursors may be other substances, provided that the resulting mixture does not involve parasitic reactions other than the polymerization reaction. Similarly, the added monomers may be different from acrylamide and from N,N'-methylbisacrylamide provided that they do no react with liquid copper, calcium, and titanium precursors and that they enable a bi-directional polymerization.

A heating at a temperature on the order of 80° C. for from 3 to 5 minutes is performed. A solution of 6 g of azoisobutyronitrile in 120 g of acetone is then added. The mixture is heated at a 100° C. for from 5 to 30 minutes until forming of an auxiliary organic gel detected by its light blue color.

A calcinations at a temperature of 500° C. only is performed for twenty hours. The selected calcinations temperature is typically the minimum temperature necessary to obtain a crystal system, short of which an amorphous system is obtained after calcinations. The resulting crystallized product is reduced to powder by introduction into a mixing device, for example, a device called Turbula, sold by Biolock Company under reference C32297, in the presence of zirconia and isopropanol balls. The balls are then retrieved and the isopropanol is dried under extractor by drying at 60° C. for two hours.

The resulting powder is impregnated with a binder. The added binder quantity is selected to give a pasty consistency without being liquid. For example, for a $Ca_{0.25}Cu_{0.75}TiO_3$ ceramic, for 1 g of powder, 8 g of polyvinylic alcohol in a solution at 5% in water will be added. Preferably, according to an embodiment of the present invention, the mixture is crushed during the impregnation.

The resulting paste is partially dried in a drying chamber at 60° C. According to an embodiment of the present invention, the paste is crushed during this drying. The crushing may be a crushing performed at regular intervals outside of the furnace or a continuous crushing in an appropriately equipped furnace. In the case of an external crushing, the powder is regularly taken out of the furnace, crushed, and placed back into the furnace. For example, for 1 g of powder with 8 g of polyvinylic alcohol in a 5% solution in water, the drying is performed for thirty minutes with intermediary crushings every two minutes. The drying is interrupted before the paste is completely dry.

The drying is finished at a 200° C. temperature in the furnace for a duration typically on the order of at least four hours. In this drying, the powder is preferably also crushed, continuously or intermittently, in the furnace or outside.

Once the power has been completely dried, it is shaped up as a pellet or a bar by isostatic pressing and sintering at 1,000° C. for twenty hours.

The obtained $CaCu_3Ti_4O_{12}$-type ceramic exhibits a density on the order of from 75 to 80%, or even more, for an average grain size on the order of from 3 to 4 µm with a 2-µm variation range, while the previously-described conventional method would typically provide ceramics having densities from 70 to 98% for an average grain size from 1 to 1.5 µm, to within 0.5 µm.

At equal density, a ceramic according to an embodiment of the present invention advantageously exhibits a greater grain size than a ceramic according to the prior art.

The dielectric constant of the $CaCu_3Ti_4O_{12}$ ceramic is greater than 3,000. For example, for a target having a 80% density and a grain size of 4.1±1.8 µm, the dielectric constant is on the order of 9,000 instead of 3,000 for a conventional ceramic of same 80% density but having a grain size of only 1.3±0.4 µm.

Of course, the present invention is likely to have various, alterations, improvements, and modifications which will readily occur to those skilled in the art. In particular, the used precursors depend on the desired ceramic type. Similarly, the used monomers depend on the polymer to be formed. Similarly, the binder added to the crystal powder before the shaping depends on the concerned ceramic. Generally, the sequence of standard steps of shaping of a ceramic target from an oxide powder is modified by providing a calcinations at a minimum temperature to obtain a crystal powder (non amorphous), then a partial drying at reduced temperature after introduction of a binder, followed by a drying at higher temperature before the shaping, the powder dryings being combined with crushings.

Furthermore, an integrated circuit such as a processor or memory may include an insulator ceramic such as described above, and an electronic system such as a computer system may include such an integrated circuit.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A material made of a dielectric oxide of type $Ca_{0.25}Cu_{0.75}TiO_3$ having a dielectric constant greater than 4,000 and a grain size at least equal to 2 µm.

2. A material, comprising:
   a $Ca_{0.25}Cu_{0.75}TiO_3$ ceramic having a grain size that is greater than 1.7 µm and a dielectric constant greater than 4,000.

3. The material of claim 2 wherein the ceramic has a grain size that is greater than or equal to approximately 2 µm.

4. The material of claim 2 wherein the ceramic has a grain size of approximately 4.1±1.8 µm.

5. The material of claim 2 wherein the ceramic comprises $CaCu_3Ti_4O_{12}$.

6. The material of claim 2 wherein the ceramic has a density of approximately 80%.

7. An integrated circuit, comprising:
   a layer of $Ca_{0.25}Cu_{0.75}TiO_3$ ceramic having a grain size that is greater than 1.7 µm and a dielectric constant greater than 4,000.

8. An electronic system, comprising:
   an integrated circuit including a layer of $Ca_{0.25}Cu_{0.75}TiO_3$ ceramic having a grain size that is greater than 1.7 µm and a dielectric constant greater than 4,000.

9. A method for shaping a dielectric oxide, comprising the steps of:
   calcinating a gel comprising the oxide components and a polymer at a minimum temperature capable of obtaining a crystal system;
   reducing to powder the calcinations product;
   adding a liquid binder to the powder; and
   drying the mixture of the binder and of the powder and crushing the mixture during the drying.

10. The method of claim 9, further comprising, after the drying step, an isostatic pressing and a sintering of the dried product.

11. The method of claim 9, wherein the drying step comprises the steps of:
partially drying the mixture at a relatively low temperature; and
completely drying the mixture at a relatively high temperature.

12. The method of claim 11, wherein the oxide powder is of $Ca_{0.25}Cu_{0.75}TiO_3$ type, the calcinations step being performed at 500° C. for twenty hours, the binder being polyvinylic alcohol, the partial drying being performed in a drying chamber at 60° C. and the full drying being performed in a furnace at 200° C. for at least four hours.

13. The method of claim 9, wherein the crushing is continuously performed during the drying.

14. The method of claim 9, wherein the crushing is performed at regular intervals during the drying.

15. A method, comprising:
calcinating a gel at a temperature sufficient to yield a crystal system, the gel including an oxide and a polymer;
forming a powder from the calcinated gel;
mixing the powder with a binder;
drying the mixture of the powder and the binder; and
crushing the mixture.

16. The method of claim 15, wherein the gel comprises calcium, copper and titanium.

17. The method of claim 15 wherein calcinating the gel comprises calcinating the gel at a temperature of approximately 500° C. or greater.

18. The method of claim 15 wherein calcinating the gel comprises calcinating the gel for approximately twenty hours.

19. The method of claim 15 wherein forming a powder from the calcinated gel comprises mixing the calcinated gel with zirconia and isopropanol balls.

20. The method of claim 15 wherein mixing the powder with the binder comprises mixing the powder with a liquid binder.

21. The method of claim 15 wherein drying the mixture comprises:
drying the mixture for a first time period at a first temperature; and
drying the mixture for a second time period at a second temperature.

22. The method of claim 15 wherein crushing the mixture comprises crushing the mixture substantially continuously.

23. The method of claim 15 wherein crushing the mixture comprises periodically crushing the mixture.

24. The method of claim 15 wherein crushing the mixture comprises crushing the mixture while drying the mixture.

25. The method of claim 15, further comprising isostatically pressing and sintering the dried and crushed powder at approximately 1000° C. for approximately twenty hours into a mass having a predetermined shape.

* * * * *